United States Patent [19]
Meg

[11] Patent Number: 6,021,188
[45] Date of Patent: Feb. 1, 2000

[54] CALLER IDENTIFICATION INFORMATION PRINTING SYSTEM AND METHOD

[76] Inventor: Alfred Meg, 810 Harbins Cove, Lilburn, Ga. 30247

[21] Appl. No.: 08/876,978

[22] Filed: Jun. 16, 1997

[51] Int. Cl.[7] ............................. H04M 1/56; H04M 15/06
[52] U.S. Cl. ........................................ 379/142; 379/93.23
[58] Field of Search ................................ 379/142, 116, 379/119, 354, 93.23, 118, 120

[56] References Cited

U.S. PATENT DOCUMENTS

| | | | |
|---|---|---|---|
| 3,684,832 | 8/1972 | Marguth, Jr. | 379/93.18 |
| 3,739,338 | 6/1973 | Jacobson et al. | 379/93.23 |
| 3,798,598 | 3/1974 | Tambert et al. | 379/93.08 |
| 4,942,616 | 7/1990 | Linstroth et al. | 379/142 |
| 5,533,102 | 7/1996 | Robinson et al. | 379/142 |
| 5,559,860 | 9/1996 | Mizikovsky | 379/142 |
| 5,734,706 | 3/1998 | Windsor et al. | 379/142 |
| 5,748,718 | 5/1998 | Manicone | 379/142 |

*Primary Examiner*—Curtis A. Kuntz
*Assistant Examiner*—Rexford N. Barnie

[57] ABSTRACT

A new Caller Identification Information Printing System and Method for printing the caller identification information received by the caller identification device. The inventive device includes a serial printer, an interface operably coupled between the caller identification device and the serial printer for transmitting and receiving information to and from the caller identification device and the serial printer and a switch for generating a print signal, the print signal being interpretable by the caller identification device, the caller identification device supplying control signals and the caller identification information to the interface in response to the print signal.

2 Claims, 2 Drawing Sheets

CALLER IDENTIFICATION INFORMATION PRINTING SYSTEM AND METHOD

BACKGROUND OF THE INVENTION

1. Field of the Invention

The present invention relates to caller identification devices used in telecommunications networks and more particularly pertains to a new Caller Identification Information Printing System and Method for printing the caller identification information received by the caller identification device.

2. Description of the Prior Art

The use of caller identification devices used in telecommunications networks is known in the prior art. More specifically, caller identification devices used in telecommunications networks heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new Caller Identification Information Printing System and Method. The inventive device includes a serial printer, an interface means operably coupled between the caller identification device and the serial printer for transmitting and receiving information to and from the caller identification device and the serial printer and a means for generating a print signal, the print signal being interpretable by the caller identification device, the caller identification device supplying control signals and the caller identification information to the interface means in response to the print signal.

In these respects, the Caller Identification Information Printing System and Method according to the present invention substantially departs from the conventional concepts and designs of the prior art, and in so doing provides an apparatus primarily developed for the purpose of printing the caller identification information received by the caller identification device.

SUMMARY OF THE INVENTION

In view of the foregoing disadvantages inherent in the known types of caller identification devices used in telecommunications networks now present in the prior art, the present invention provides a new Caller Identification Information Printing System and Method construction wherein the same can be utilized for printing the caller identification information received by the caller identification device.

The general purpose of the present invention, which will be described subsequently in greater detail, is to provide a new Caller Identification Information Printing System and Method apparatus and method which has many of the advantages of the caller identification devices used in telecommunications networks mentioned heretofore and many novel features that result in a new Caller Identification Information Printing System and Method which is not anticipated, rendered obvious, suggested, or even implied by any of the prior art caller identification devices used in telecommunications networks, either alone or in any combination thereof.

To attain this, the present invention generally comprises a serial printer, an interface means operably coupled between the caller identification device and the serial printer for transmitting and receiving information to and from the caller identification device and the serial printer and a means for generating a print signal, the print signal being interpretable by the caller identification device, the caller identification device supplying control signals and the caller identification information to the interface means in response to the print signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, capon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Caller Identification Information Printing System and Method apparatus and method which has many of the advantages of the caller identification devices used in telecommunications networks mentioned heretofore and many novel features that result in a new Caller Identification Information Printing System and Method which is not anticipated, rendered obvious, suggested, or even implied by any of the prior art caller identification devices used in telecommunications networks, either alone or in any combination thereof.

It is another object of the present invention to provide a new Caller Identification Information Printing System and Method which may be easily and efficiently manufactured and marketed.

It is a further object of the present invention to provide a new Caller Identification Information Printing System and Method which is of a durable and reliable construction.

An even further object of the present invention is to provide a new Caller Identification Information Printing System and Method which is susceptible of a low cost of manufacture with regard to both materials and labor, and which accordingly is then susceptible of low prices of sale to the consuming public, thereby making such Caller Identification Information Printing System and Method economically available to the buying public.

Still yet another object of the present invention is to provide a new Caller Identification Information Printing System and Method which provides in the apparatuses and methods of the prior art some of the advantages thereof, while simultaneously overcoming some of the disadvantages normally associated therewith.

Still another object of the present invention is to provide a new Caller Identification Information Printing System and Method for printing the caller identification information received by the caller identification device.

Yet another object of the present invention is to provide a new Caller Identification Information Printing System and Method which includes a serial printer, an interface means operably coupled between the caller identification device and the serial printer for transmitting and receiving information to and from the caller identification device and the serial printer and a means for generating a print signal, the print signal being interpretable by the caller identification device, the caller identification device supplying control signals and the caller identification information to the interface means in response to the print signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
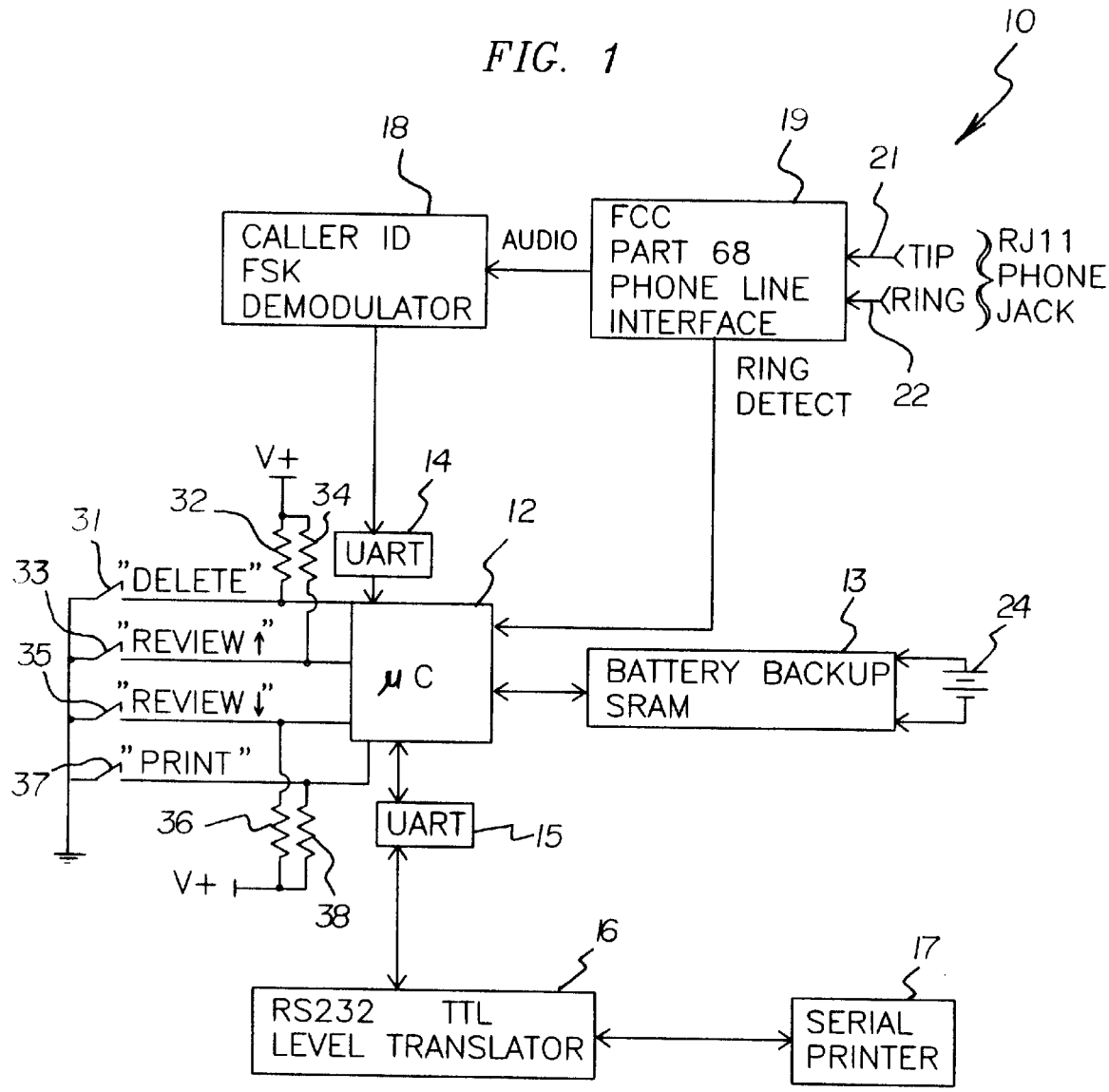
FIG. 1 is a schematic view of the control circuit according to the present invention.
Figure 2:
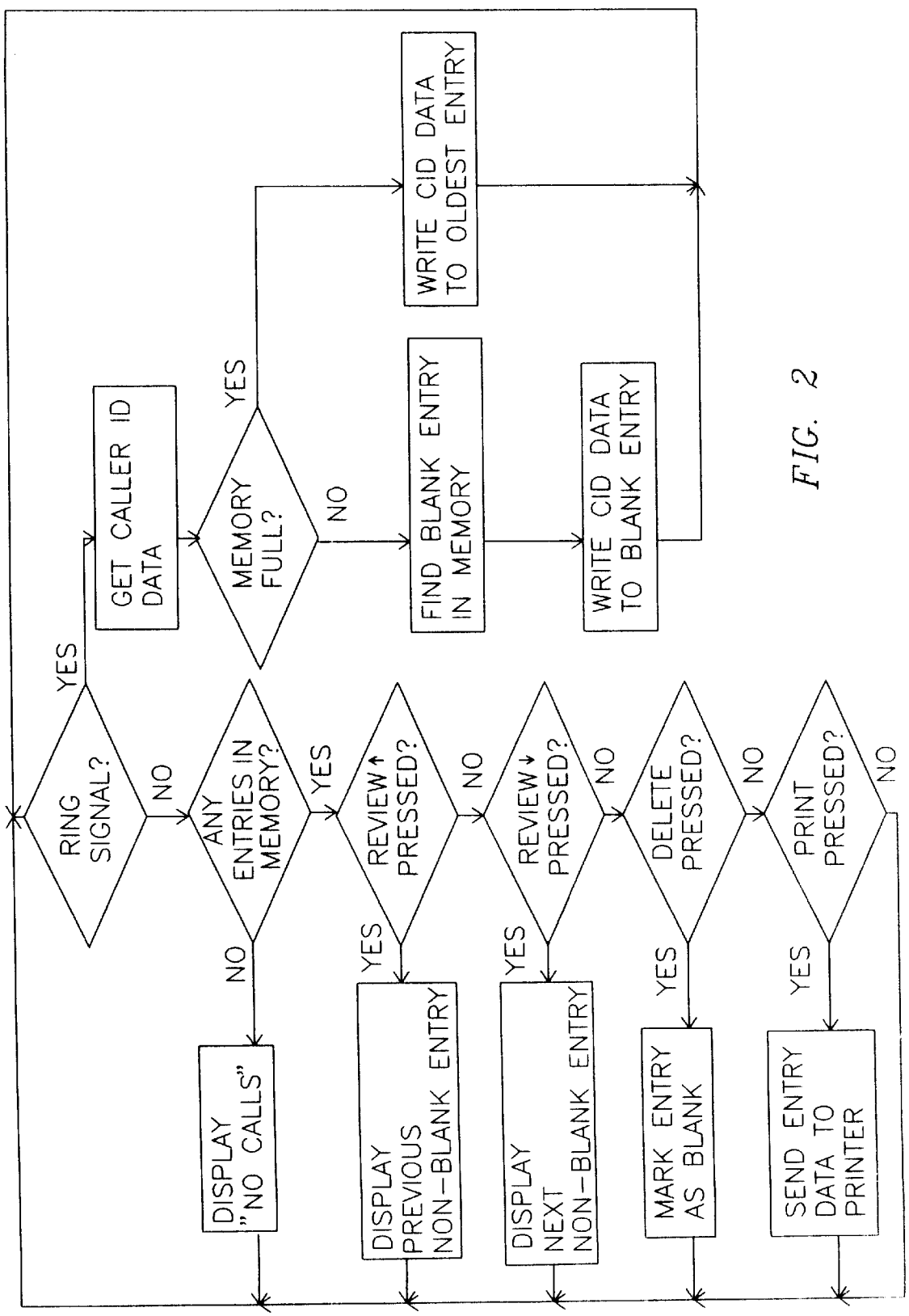
FIG. 2 is a program flow diagram showing the manner in which the microcontroller of the FIG. 1 control circuit can be preprogrammed in accordance with the present invention.

With reference now to the drawings, and in particular to FIGS. 1 and 2 thereof, a new Caller Identification Information Printing System and Method embodying the principles and concepts of the present invention and generally designated by the reference numeral 10 will be described.

More specifically, it will be noted that the Caller Identification Information Printing System and Method 10 comprises a serial printer 17 operably connected to an interface means consisting of a RS232 to TTL level translator 16 operably coupled to a universal asynchronous transmitter/receiver (hereinafter UART) 15 which is operably connected to a microcontroller 12 of a conventional caller identification device having a back-up battery powered static RAM device 13. A print switch 37 provides a means for generating the print signal.

With reference to FIG. 1 there is shown a conventional caller identification device including a standard FCC Part 68 phone line interface 19 having tip and ring inputs 21 and 22 respectively. A caller identification frequency shift keyed data demodulator 18 is shown for receiving the audio caller identification information. A UART 14 receives the serial data stream and performs a serial to parallel conversion of the data stream for transmission to the microcontroller 12.

With continued reference to FIG. 1 there is shown the conventional functions of the caller identification device. A Delete switch 31 is shown in series with a pull-up resistor 32. A Review Up switch 33 is shown in series with a pull-up resistor 34. A Review Down switch 35 is shown in series with a pull-up resistor 36. Switches 31, 33 and 35 are preferably momentary single pole, single throw switches. A new Print switch 37 is shown in series with a pull-up resistor 38. When the momentary single pole, single throw, switch is closed, the input to the microcontroller 12 goes low.

With reference to FIG. 2 the microcontroller 12 monitors the phone line interface 19 for a ring signal. If a ring signal is detected then the caller identification data is written into memory at the next available entry location. If the memory is full then the entry location having the oldest caller identification data is overwritten.

The microcontroller 12 also monitors the status of the Delete switch 31, Review Up switch 33, Review Down switch 35 and Print switch 37. In the case that there are no entries in memory, "No Calls" is displayed on an LCD screen. If the Review Up switch 33 is momentarily closed then the previous non-blank entry is displayed. If the Review Down switch 35 is momentarily closed then the next non-blank entry is displayed. If the Delete switch 31 is momentarily closed then the current entry is marked as blank. If the Print switch 37 is momentarily closed then the current entry containing the caller identification information is sent to the printer interface means 15, 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Caller Identification Information Printing System for printing caller identification information for use with a caller identification device comprising:

a serial printer;

a universal asynchronous receiver/transmitter operably coupled to a RS232 TTL level translator operably coupled between the caller identification device and the serial printer for transmitting and receiving information to and from the caller identification device and the serial printer;

a means for generating a print signal, the print signal being interpretable by the caller identification device, the caller identification device supplying control signals and the caller identification information to the universal asynchronous receiver/transmitter in response to the print signal; and wherein the means for generating the print signal further comprises a momentary single pole, single throw switch operably coupled to the caller identification device.

2. A Method of Printing Caller Identification Information comprising the steps of:

providing a serial printer;

providing a universal asynchronous receiver/transmitter operably coupled to a RS232 TTL level translator operably coupled between the caller identification device and the serial printer for transmitting and receiving information to and from the caller identification device and the serial printer;

providing a means for generating a print signal, the print signal being interpretable by the caller identification device, the caller identification device supplying control signals and the caller identification information to the universal asynchronous receiver/transmitter in response to the print signal; and wherein the means for generating the print signal further comprises a momentary single pole, single throw switch operably coupled to the caller identification device.

* * * * *